United States Patent [19]

Cetnarowski

[11] Patent Number: 5,076,090
[45] Date of Patent: Dec. 31, 1991

[54] DUAL ACTION EQUALIZING APPARATUS

[75] Inventor: Robert W. Cetnarowski, Pearl Beach, Mich.

[73] Assignee: Utica Enterprises, Inc., Sterling Heights, Mich.

[21] Appl. No.: 570,964

[22] Filed: Aug. 21, 1990

Related U.S. Application Data

[63] Continuation of Ser. No. 333,649, Apr. 5, 1989, abandoned.

[51] Int. Cl.$^5$ .................. B21J 13/04; B23Q 3/08; B23B 39/10; F01B 9/00
[52] U.S. Cl. .................. 72/407; 72/453.01; 72/453.03; 269/32; 269/227; 92/68; 92/136; 408/41; 408/130; 83/639.5
[58] Field of Search .............. 72/407, 453.01, 453.02, 72/453.03, 453.15, 449, 392, 302; 269/34, 25, 32, 26, 227; 92/68, 72, 73, 136, 138; 408/41, 37, 130, 135; 29/252; 83/639.1, 639.5, 629

[56] References Cited

U.S. PATENT DOCUMENTS

| 1,397,980 | 11/1921 | Ouellette | 72/472 |
| 1,817,070 | 8/1931 | Eksergian et al. | 83/639.1 |
| 1,971,685 | 8/1934 | Katterjohn | 92/136 |
| 2,679,177 | 5/1954 | Gepfert | 269/227 |
| 2,681,581 | 6/1954 | Pearson | 269/227 |
| 3,156,160 | 11/1964 | Meyer | 92/68 |
| 3,213,760 | 10/1965 | Carr | 92/136 |
| 3,447,423 | 6/1969 | Henry | 92/68 |
| 3,831,500 | 8/1974 | Kitamura | 92/68 |
| 4,215,611 | 8/1980 | Dahms | 83/639.1 |
| 4,653,310 | 3/1987 | Urata et al. | 72/407 |
| 4,795,124 | 1/1989 | Nagai | 72/422 |

FOREIGN PATENT DOCUMENTS

| 3306480 | 8/1984 | Fed. Rep. of Germany | 92/68 |
| 1257813 | 2/1961 | France | 269/34 |
| 33656 | 10/1971 | Japan | 92/68 |
| 173437 | 10/1982 | Japan | 408/135 |
| 73607 | 4/1984 | Japan | 92/136 |
| 1518931 | 7/1978 | United Kingdom | 92/136 |

*Primary Examiner*—Daniel C. Crane
*Attorney, Agent, or Firm*—Remy J. VanOphem

[57] ABSTRACT

An apparatus for providing a reciprocating motion. The apparatus has a housing block that contains twin piston guides in spaced apart relationship to one another. The piston guides each contain a piston that has a gear rack. The gear racks are connected by a pinion gear so that the movement of one piston will cause an equal and opposite movement of the other piston. The movement of the pistons is controlled by the application of a fluid pressure to one or both of the pistons. The travel of the pistons is limited by a mechanical stop at one end and a fluid cushion device at the other end. Tools for the altering of a workpiece may be attached to one or both ends of the pistons. In one embodiment, the apparatus is subjected to a rotary displacement achieved through the linear motion of one of the pistons.

18 Claims, 4 Drawing Sheets

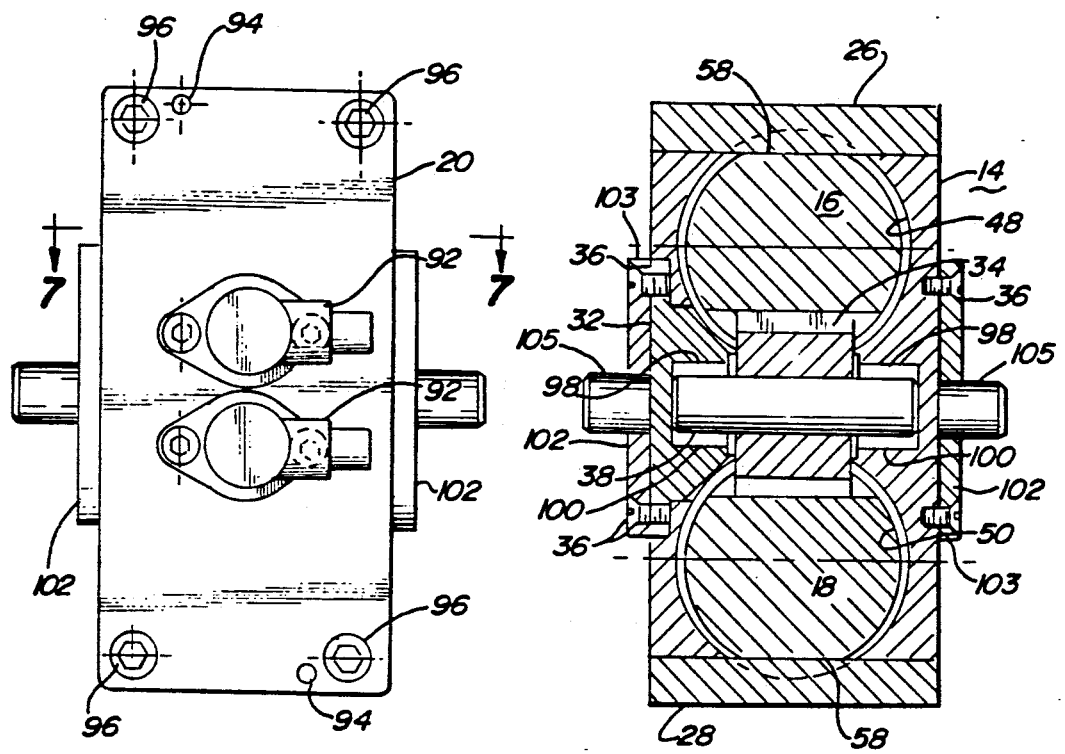
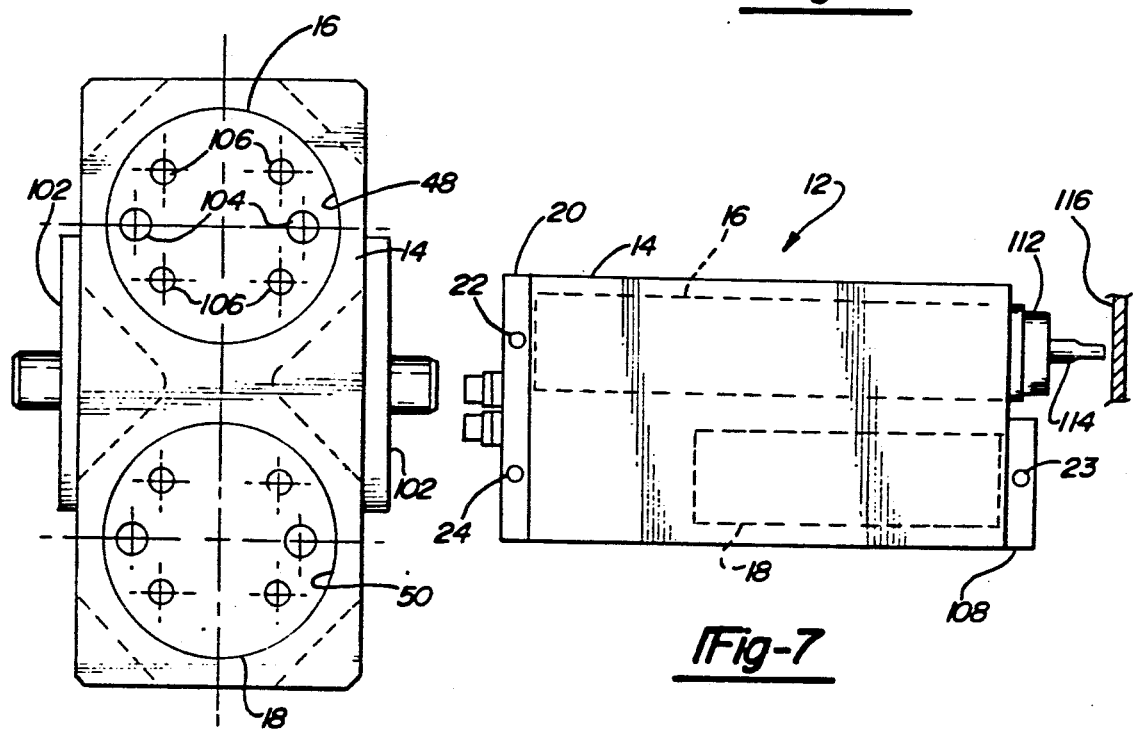

DUAL ACTION EQUALIZING APPARATUS

This is a continuation of application Ser. No. 07/333,649, filed Apr. 05, 1989, now abandoned.

BACKGROUND OF THE INVENTION

1. Field of the Invention

The present invention relates to a fluid powered apparatus that has application for clamping, punching, and other functions that are necessary in the manufacture and assembly of machines such as automobiles. More particularly, the invention is related to a dual action fluid powered apparatus having two pistons that are spaced apart from one another. The pistons each have a gear rack that meshes with a pinion gear that is common to both gear racks. The pistons are fluid powered and are capable of having tools attached thereto. A fluid force may be applied to one or both pistons, depending upon the application and the task that is being performed.

2. Description of the Prior Art

The prior art reveals a wide variety of devices that employ rack and pinion gears to change arcuate motion to a translatory function, or vice versa. In general, most of the prior art devices utilize the pinion gear shaft to supply power to the device or else take power out via the pinion shaft. The majority of the prior art devices employ a rack gear that is formed from plate or bar stock.

The present invention differs from the rack and pinion gear driven machine tool that is shown and described in U.S. Pat. No. 3,722,711 entitled "Machine Tool" issued Mar. 27, 1973, to William B. Seidel. The machine tool has a pair of tool receiving arms that are driven in part by a rack and pinion gear assembly. FIG. 4 of the drawings in U.S. Pat. No. 3,722,711 shows a view in cross-section of the mounting block and the cylinder piston that are mounted in spaced apart and parallel arrangement to one another. A shaft 32 is positioned between the spaced apart pistons. The shaft contains teeth that mesh with a linear array of teeth that are contained on each piston. The pistons are contained entirely within the bores in the housing.

During the operation of the machine tool, a fluid such as air is introduced behind the first piston causing it to move. The rack gear formed on the piston interacts with the intermeshed pinion gear and its attached shaft, causing it to rotate and deliver power to the remainder of the machine tool. The first piston chamber is then vented and fluid pressure is then applied to the second piston, thus causing it to rotate the intermesh pinion gear and its attached shaft in the opposite direction.

Thus, the present invention differs from the previously described machine tool in that both ends of the piston are not confined within the piston housing. There is a direct connection of the pistons to a tool positioned outside the housing. Also, the device of U.S. Pat. No. 3,722,711 is utilized strictly as a power source to rotate a shaft that has a pinion gear formed on the end thereof.

In U.S. Pat. No. 2,818,002 entitled "Transfer Machines" issued Dec. 31, 1957, to Barker et al, there is shown a transfer machine that uses a plurality of clamps to hold a workpiece. The jaws of the clamps are moved toward and away from one another by a series of rack and pinion devices. FIG. 3 of the invention shows in detail two rack and pinion assemblies. The lower rack and pinion assembly contains a piston coupled to a piston rod that serves as a tooth containing rack gear. A pinion gear 68 is keyed to a shaft 69. When pressure is applied to the piston 65, the linear movement of the rack gear is transferred to arcuate movement through the pinion gear, causing the shaft attached thereto to rotate and deliver power to another section of the machine.

In a somewhat similar application, the upper rack and pinion assembly shown in FIG. 3 of U.S. Pat. No. 2,818,002 utilizes a closed piston chamber of cylindrical configuration. The piston confined within the chamber has a rack gear located between the opposed piston heads. The pinion gear is fixed to a shaft. During the operation of the transfer machine, hydraulic fluid is first introduced at one end of the piston to drive it in a forward direction, causing the pinion gear containing shaft to rotate. Hydraulic fluid is then introduced to the other end of the piston rod, causing the piston to move in a reverse direction. Consequently, the pinion gear containing shaft reverses its rotation.

The transfer machine set forth above utilizes but a single piston shaft that is adapted for the application of a pressure inducing force at either end. In both adaptations of the rack and pinion gear driven devices shown in U.S. Pat. No. 2,818,002, the primary purpose was to power a shaft connected to the pinion gear. Also, there are no attachments affixed to the ends of the pistons which are fully contained within the piston chambers.

An adaptation of a rack and pinion gear driven device is shown in U.S. Pat. No. 2,595,131 entitled "Load Grip Means for Trucks and the Like" issued Apr. 29, 1952 to Leslie G. Ehmann. FIG. 1 of Ehmann depicts a pair of spaced apart parallelly oriented cylinders 26. In cross-section, the cylinders are square in configuration and have a cylindrical bore located along the longitudinal axis of the cylinder. One of the four sides of each cylinder contains a rack gear. The rack gears mesh with the teeth of a pinion gear that is attached to a flange. Each one of the cylinders is powered by a piston that is connected to a piston rod. The ends of the piston rods are fixed, thus when fluid pressure is applied to the piston head, the cylinder with its attached rack gear moves in a linear direction. The pinion gear is fixed against rotation by its attached flange. Consequently, when fluid pressure is applied to the piston heads, the rack containing cylinders walk around the teeth of the fixed pinion gear. In this manner, a torque is developed to rotate the entire plate to which the cylinders and their accompanying pistons are attached.

The present invention differs from the above described device in that the ends of the pistons most remote from the end where the fluid pressure is applied are free to move into and out of engagement with a workpiece. The cylinder bores of the present invention are contained within a common block, fixing the direction taken by the pistons and their accompanying rack gears.

SUMMARY OF THE PRESENT INVENTION

The present invention is a dual action fluid actuated apparatus for use in any application where a generally linear equal and opposite compressive or tensile force is applied to shape, form or hold a workpiece.

The invention includes a housing of elongate configuration that contains two spaced apart piston guides. The piston guides traverse the entire length of the housing and are open at their opposite ends. Each one of the piston guides within the housing contains a piston. The pistons each contain a gear segment in the form of a rack gear that extends over a portion of the longitudinal extent of the pistons. A pinion gear is mounted within the housing and is positioned intermediate the two piston guides. The teeth of the pinion gear extend into each of the piston guides within the housing and mesh with the teeth of each piston rack gear. At least one end of one piston protrudes from the housing and contains a tool affixed thereto. A fluid ingress and egress is provided for the pistons so that fluid pressure will cause at least one piston to move within its piston guide and such movement will rotate the pinion gear, causing the other piston to move in a direction opposite to the direction of the piston to which the fluid pressure was initially applied. The application of fluid pressure to one of the enclosed ends of the pistons, other than the initial pressure application end, causes the pistons to reverse their directions and retract the piston carried clamp or tool from contact with a workpiece.

A primary object of the present invention is to provide a force generating dual action apparatus that is compact and can function with a variety of tools attached thereto.

Another object of the present invention is to provide an apparatus that utilizes a double rack and pinion gear to produce equal and opposite forces to move tools into and out of engagement with a workpiece.

A further object of the present invention is to provide a force generating dual action apparatus that is fluid driven.

Another object of the present invention is to provide an apparatus that contains two pistons that move in opposite directions when fluid pressure is applied to one of the pistons.

Still another object of the present invention is to provide a tool carrying apparatus that contains a minimum of moving parts.

A further object of the present invention is to reduce the work cycle time in that both pistons move tools or clamps simultaneously into and out of engagement with a workpiece.

Another object of the present invention is to eliminate the whipping or arcing movements associated with non-linear motion devices.

A further object of the present invention is to provide an apparatus having increased smoothness of performance.

Further objects and advantages of the present invention will become apparent from the following description and the appended claims, reference being made to the accompanying drawings forming a part of this specification, wherein like reference characters designate corresponding parts in the several views.

BRIEF DESCRIPTION OF THE DRAWINGS

FIG. 4 is an end view of the embodiment of FIG. 2 that shows the end cap and the parts attached thereto;

FIG. 5 is a cross-sectional view taken along section lines 5—5 of FIG. 2 that shows the pinion gear, its support shaft and the pistons within their respective piston guides;

FIG. 6 is an end view taken along section lines 6—6 of FIG. 2 that shows the mounting details at the free ends of the pistons;

FIG. 7 is a simplified side view of an alternate embodiment of the present invention wherein fluid pressure can be applied simultaneously to both pistons;

DETAILED DESCRIPTION OF THE PREFERRED EMBODIMENT

Figure 1:
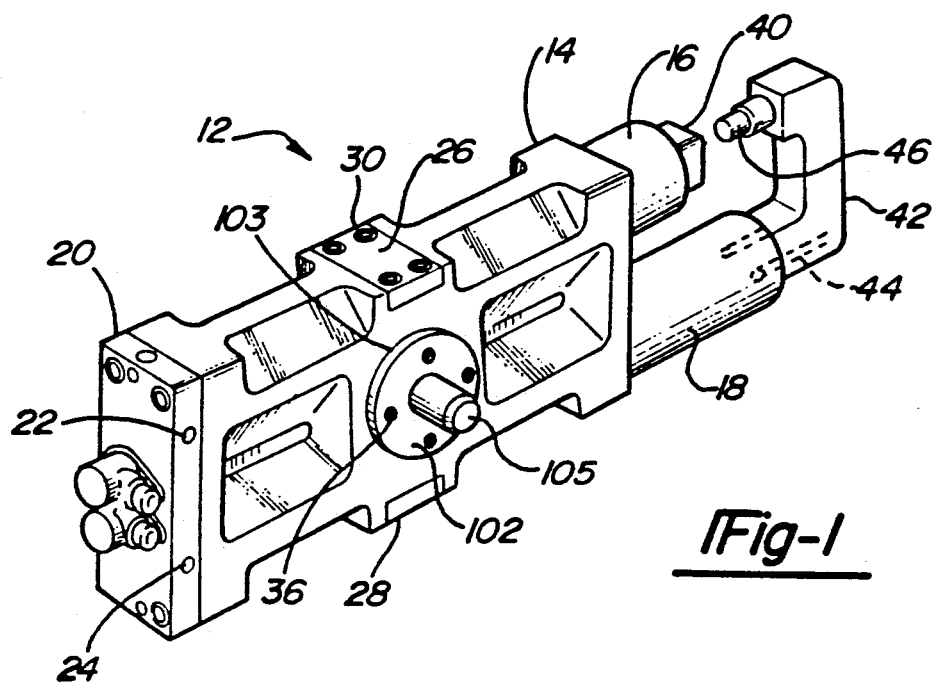
FIG. 1 is a perspective view that shows one embodiment of the dual action apparatus of the present invention.

Referring now to the drawings and more particularly to FIG. 1, there is illustrated in perspective a first embodiment of dual action apparatus 12 in the form of a self equalizing punch and die combination. Other embodiments of the present invention will be described hereinafter.

Figure 2:
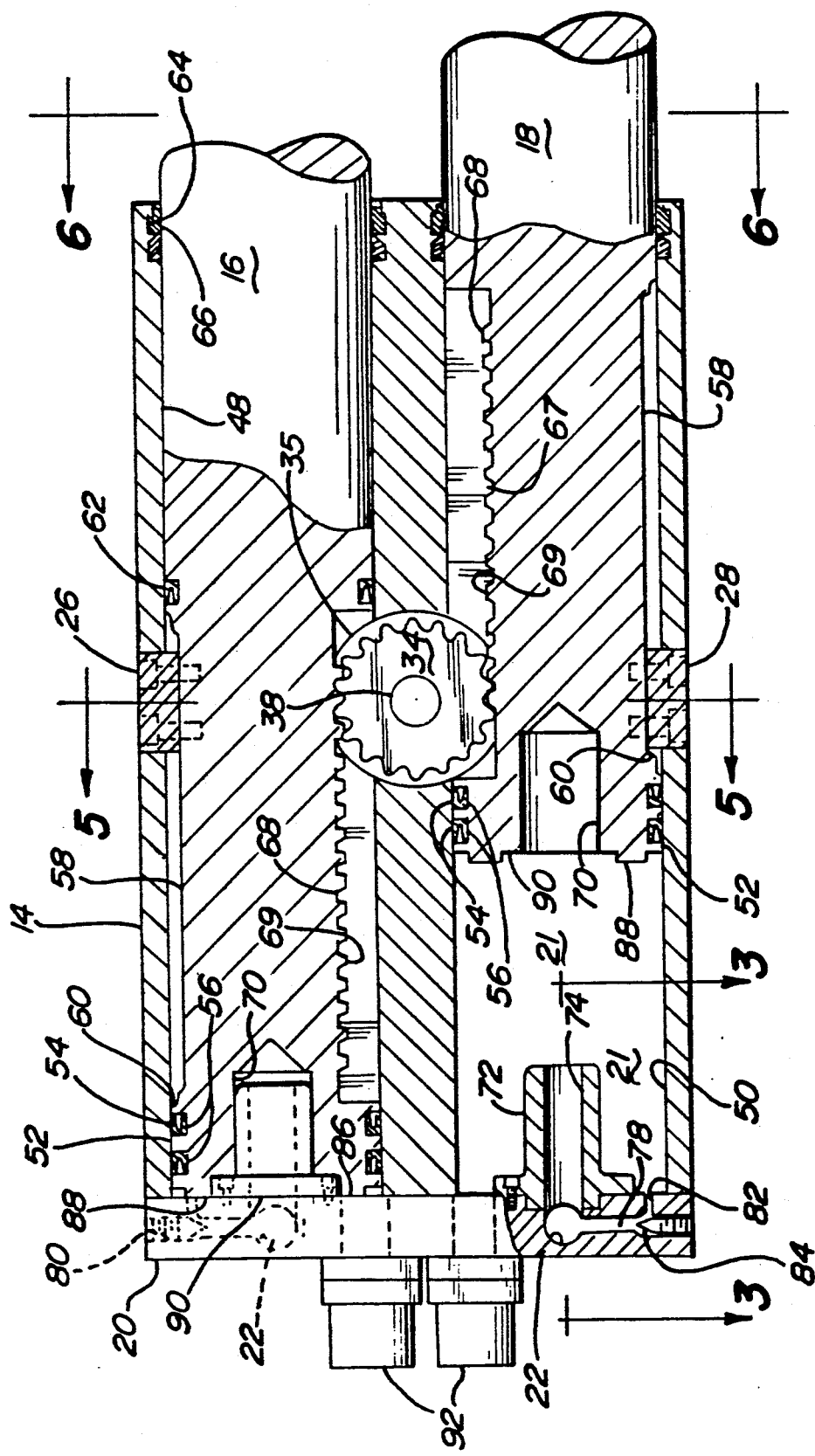
FIG. 2 is a cross-sectional side view, showing the rack containing pistons and their interconnection to one another.
Figure 10:
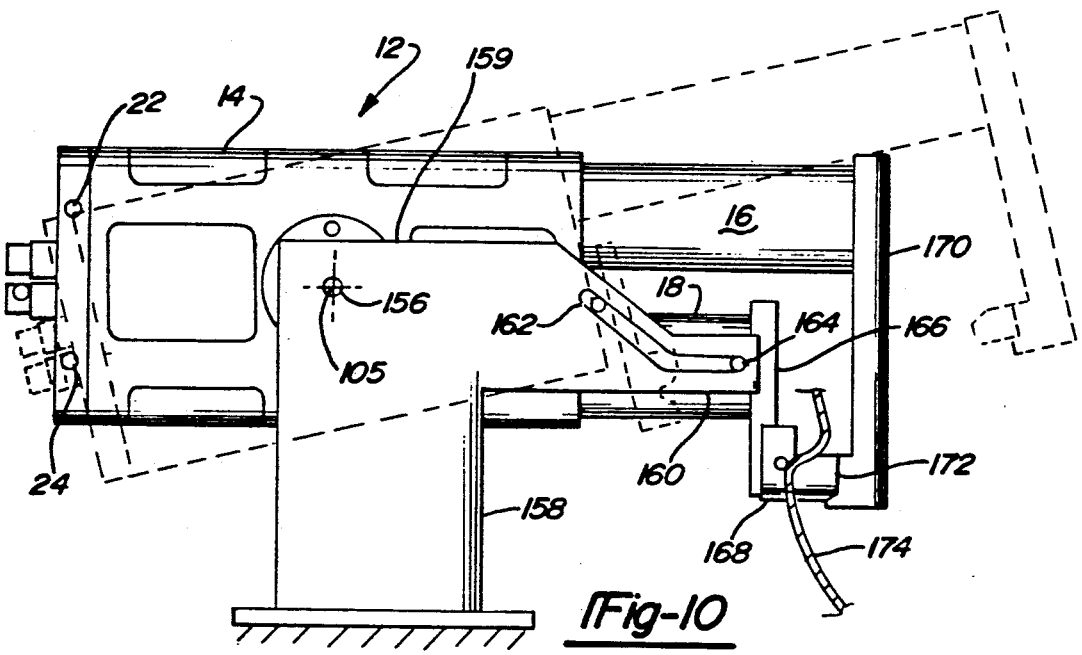
FIG. 10 is a simplified side view of an embodiment of the present invention wherein the linear movement of one of the pistons is utilized to rotate the entire apparatus into and out of engagement with a workpiece.

Referring to FIG. 1, a housing block 14 of the dual action apparatus has an integral metal structure that contains a top piston 16 and a bottom piston 18 therein. The top piston 16 and the bottom piston 18 are positioned longitudinally within the housing block 14 and are spaced apart from one another in generally parallel relationship. An end cap 20 is attached to one end of the housing block 14 thus providing pressure chambers 21 at the ends of the top piston 16 and the bottom piston 18 as shown in FIG. 2, so that a fluid can drive one or another of the top and bottom pistons 16 and 18. A fluid port 22 permits a fluid to be conducted to or exhausted from the pressure chamber at the end of the top piston 16. Likewise, a fluid port 24 permits a fluid to be conducted to and exhausted from the pressure chamber at the end of the bottom piston 18. Alignment blocks 26 and 28 are attached to the midsection of the housing block 14. The function of the alignment blocks 26 and 28 will be explained later herein. The alignment blocks 26 and 28 are fastened to the housing block 14 by appropriate fasteners, such as bolts 30. A pivotable support member 10 is attached to each side of the housing block 14 by bolts 36. The pivotable support members 102 are used to pivotably support the dual action apparatus 12 as shown in FIG. 10. In the embodiment of the invention shown in FIG. 1, a die block 40 is affixed to the free end of the top piston 16. A punch holder 42 is attached to the free end of the bottom piston 18 by fasteners such as bolts 44. A punch 46 is positioned at the end of the punch holder 42 so that it is in axial alignment with the center of the die block 40. As the punch 46 and the die block 40 are moved toward each other, they can perform useful work on a workpiece.

FIG. 2 is a cross-sectional side view of an apparatus shown in FIG. 1. FIG. 2 shows the top piston 16 and the bottom piston 18 each having a toothed rack 68. The toothed racks 68 of the top piston 16 and bottom piston 18 are interconnected by a pinion gear 34.

The housing block 14 has an upper piston guide 48 that contains the top piston 16. A lower piston guide 50 is provided below the upper piston guide 48 in the housing block 14 and contains the bottom piston 18 in generally parallel alignment with the top piston 16. While the longitudinal axes of the upper piston guide 48 and the lower piston guide 50 are shown parallel to one another, it is entirely within the present invention to have the upper and lower piston guides 48 and 50 oriented in a non-parallel relationship to one another for special applications. Further, it is entirely within the present invention that the cross-section of the pistons 16 and 18 and piston guides 48 and 50 need not be circular as shown, but may be square or any other geometrical shape.

The top piston 16 and the bottom piston 18 are essentially identical in the embodiment shown in FIG. 2, therefore, only one will be described in detail with like numerals assigned to the respective identical parts or features of the other. The top piston 16 has a piston head 52 provided adjacent the end of the housing block 14 that contains the end cap 20. The piston head 52 has a fluid seal 54 that is positioned within a groove 56. One or more fluid seals 54 may be employed. The material of the fluid seals 54 may be elastomeric or metallic in composition.

The top piston 16 has a recessed flat surface 58 provided along a portion of its top surface. This recessed flat surface terminates in an end abutment 60 that is adjacent the piston head 52. The abutment 60 interacts with the associated alignment block 26 or 28 that is fastened to the housing block 14. As can be seen in FIG. 2, the alignment blocks 26 and 28 protrude into the upper and lower piston guides 48 and 50, respectively. The alignment blocks 26 and 28 are made of bronze, aluminum, or similar soft metal so that they will not damage the top and bottom pistons 16 and 18 when they engage the abutments 60 during extension of the top and bottom pistons 16 and 18 from the housing block 14. Thus, the alignment blocks 26 and 28, when worn, can be readily replaced without disassembly of the dual action apparatus 12. An intermediate seal 62 is positioned on the top piston 16 to protect the integrity of the upper piston guide 48. Additionally, a wiper seal 64 is positioned within a groove 66 that is provided at the end of the housing block opposite the end cap 20.

The top piston 16 and the bottom piston 18 each contain the toothed racks 68 which are provided along the longitudinal surface opposite the flat surface 58. The racks 68 have teeth 69 which mesh with the teeth 35 of the pinion gear 34. The pinion gear 34 is journalled for rotation about a pinion shaft 38 having its opposite ends supported by the housing block 14. With this arrangement, it is evident that longitudinal movement of the top piston 16 in one direction will cause the bottom piston 18 to move in the opposite direction an equal amount.

In order to prevent the bottom piston 18 from destructively impacting against the end cap 20, a cushioning mechanism is incorporated into the design. A cushion bore 70 is provided in the piston head 52 along the longitudinal axis thereof. A cushion probe 72 is attached to the end cap 20 in axial alignment with the cushion bore 70. The cushion probe 72 is sized to slide easily into the cushion bore 70. The cushion probe 72 has a central aperture 74 throughout its axial extent. The central aperture 74 connects to one of the fluid ports 22 or 24 provided in the end cap 20. As previously stated, the fluid ports 22 and 24 permit a fluid under pressure to be conducted to the pressure chambers 21 formed between the end cap 20 and the piston. A needle valve bore 78 is provided in the end cap 20. The needle valve bore 78 is in fluid communication with the central aperture 74 of the cushion probe 72 through the fluid ports 22 or 24. A threaded bore 80 is provided in the end cap 20 in alignment with the needle valve bore 78. A return bore 82 is also provided in the end cap 20 which connects the threaded bore 80 to the pressure chamber 21. A fluid metering screw 84 is threadedly engaged in the threaded bore 80 with its tip in the vicinity of the intersection of the needle valve bore 78 and the threaded bore 80. Thus, the flow of the pressurized fluid from the central aperture 74 of the cushion probe 72 to the pressure chamber 21 can be controlled by adjusting the metering screw 84. While the metering mechanism has been described with reference to the bottom piston 18, the same metering mechanism is employed for the top piston 16 and in each subsequent embodiment described hereinafter whenever an end cap 20 is positioned adjacent to a piston head 52.

The piston head 52 not only contains the cushion bore 70 but it also contains a plurality of axially extending bosses 88. The bosses 88 prevent an end surface 90 of the piston head from contacting the interior surface 86 of the end cap 20. The small gap provided by the bosses 88 permits the pressurized fluid to be applied across the entire end surface 90 of the piston head 52 when it is introduced into the pressure chamber 21 through the central aperture 74 of the cushion probe 72.

In addition to the cushion probes 72, the end cap 20 also has, mounted thereon, a proximity sensor 92 for each of the top and bottom pistons 16 and 18. Thus, by means of the proximity sensor 92 it is possible to sense when the piston head 52 approaches the interior surface 86 of the end cap 20. The close proximity of the piston head 52 to the interior surface 86 of the end cap 20 is an indication that a given work cycle has been completed and that the direction of movement of the top and bottom pistons 16 and 18 should be reversed by a fluid valving system (not shown), or that the apparatus 12 has completed a work cycle and should be turned off.

Figure 3:
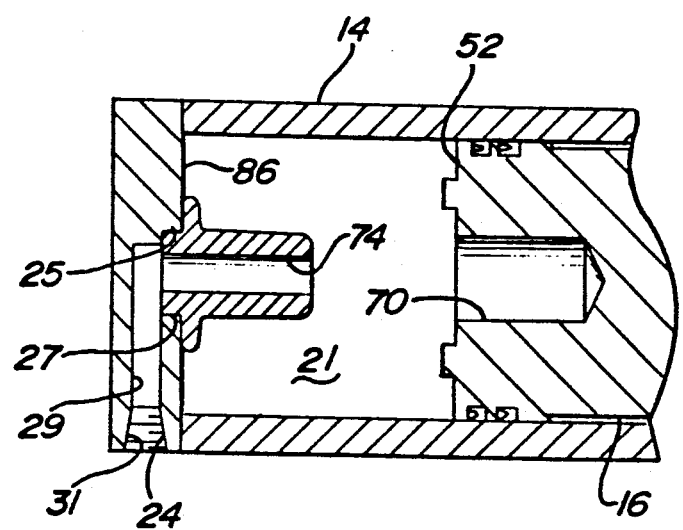
FIG. 3 is a partial cross-sectional view taken along section lines 3—3 of FIG. 2 that shows the details of the fluid ports.

FIG. 3 is a partial cross-section of the dual action apparatus 12 taken along section lines 3-3 of FIG. 2 showing the details of the fluid port 24. As shown, the end cap 20 has a probe mounting bore 25 extending part way therethrough. The probe mounting bore 25 receives a mounting boss 27 provided on the end of the cushion probe 72 and axially aligns the cushion probe 72 with the cushion bore 70 provided in the bottom piston 18. The fluid port 24 consists of a bore 29 provided in the end cap 20 having one end connected to the probe mounting bore 25 and the other end exiting the side of the end cap 20 as shown in FIG. 1. Preferably, the bore 29 has a threaded portion 31 at the end exiting the end cap 20 to permit the attachment of a fluid coupling connecting the fluid port 24 to a source of fluid power.

FIG. 4 is an end view showing the details of the end cap 20. The end cap 20 is positioned in proper alignment with the end of the housing block 14 by means of alignment pins 94. The end cap 20 is secured to the end of the housing block 14 by bolts 96. While it is not shown, a fluid-tight gasket or "O" ring is placed between the end cap 20 and the end of the housing block 14. In this manner, fluid pressure can be maintained in the pressure chamber 21 between the piston head 52 and the end cap 20.

FIG. 5 is a cross-sectional view taken along line 5—5 of FIG. 2. The top piston 16 and the bottom piston 18 are shown in their respective upper and lower piston guides 48 and 50. The alignment blocks 26 and 28 are shown protruding into the upper and lower piston guides 48 and 50 and engaging the flat surfaces 58 of the top and bottom pistons 16 and 18, respectively. The pinion gear 34 is positioned intermediate the toothed rack 68 of the top and bottom pistons 16 and 18. The pinion gear 34 is attached to the pinion shaft 38 by any well known technique, such as a press fit by means of a key. Alternatively, the pinion gear 34 and pinion shaft 38 may be an integral structure. The type of coupling between the pinion gear 34 and the pinion shaft 38 is not important, however, the pinion gear 34 and the pinion shaft preferably rotate as a unit. To aid in the longevity of the aforementioned coupled parts, the ends of the pinion shaft 38 are mounted in bearings 98. The bearings 98 are preferably needle bearings as shown but may be copper or bronze bushings as is well known in the art. Taking into consideration proper design tolerances, the needle bearings 98 are contained within a bore 100 that is provided in the housing block 14 perpendicular to and midway between the upper piston guide 48 and the lower piston guide 50. The pinion gear 34 is stabilized against lateral movement by means of a gear plug 32, which also contains a bearing 98 supporting the opposite end of the pinion shaft 38.

The pivotable support members 102 are attached to the sides of the housing block 14 and consist of a mounting plate 103 and a pivot pin 105 fixedly attached to the mounting plate. Preferably, the pivot pins 105 are axially aligned with the pinion shaft 38 and the bolts 36 used to fasten the pivotable support members to the housing block 14 can also be used to fasten the gear plug 32 to the housing block 14. However, it is not necessary that the pivotable support members 102 be attached to the housing block 14 with the pivot pins 105 aligned with the pinion shaft 38. The pivotable support members 102 may be attached to the housing block 14 at any other location on its sides or on its top and bottom surfaces to optimize the operation of the dual action apparatus 12. In a like manner, separate bolts, other than the bolts 36, may be used to attach the gear plug 32 to the housing block 14.

FIG. 6 is a view of the end of the apparatus 12 opposite the end cap 20. The dotted lines represent cavities that may be provided in the housing block 14 to decrease its weight. The configuration of the cavities can also be seen in FIG. 1. The actual dimensions of the cavities are not important with respect to the operational characteristics of the present invention.

The free ends of the top and bottom pistons 16 and 18 are adapted to receive tools or clamps of one type or another. The top piston 16 contains two pin bores 104 for receiving positioning pins (not shown). In addition to the pin bores 104, the end of the top piston 16 has an array of tapped holes 106 to enable a tool or clamp to be firmly attached to the end of the top piston 16. An example of such piston and tool combination is shown in FIG. 1 where the die block 40 is attached to the end of the top piston 16. The pin bores 104 and the tapped holes 106 are also provided on the free end of the bottom piston 18 for attaching a tool thereto, such as the punch holder 42 shown in FIG. 1.

FIG. 7 is a side view of an alternate embodiment of the present invention. The same structural features as set forth relative to FIGS. 1 through 6 are present in the embodiment shown in FIG. 6 except as noted below. The end cap 20 encloses the upper and lower piston guides 48 and 50 at one end of the housing block 14. In addition, an end cap 108 is affixed to the other end of the housing and encloses only the lower piston guide 50 that contains the bottom piston 18. The end cap 108 also has a fluid port 23 and cushion probe (not shown). The fluid port 23 is provided in the end cap 108 to facilitate the introduction and metering, of a pressurized fluid into the pressure chamber at the right-hand end of the bottom piston 18, as shown in FIG. 7. The fluid port 23 also permits fluid to be exhausted from the pressure chamber when the bottom piston is displaced towards the end cap 108. The free end of the top piston 16 has attached thereto a punch seat 112 which, in turn, supports a punch 114. The dual action apparatus 12 is positioned adjacent to a workpiece 116. Fluid pressure is applied to the fluid port 22 at the left end of the top piston 16 and also to the fluid port 23 at the right end of the bottom piston 18. The application of a fluid pressure to both the top and bottom pistons 16 and 18 doubles the amount of force delivered to the punch 114, enabling it to form an aperture through materials that are difficult to pierce. To effect a withdrawal of the punch subsequent to the piercing operation, the fluid port 22 associated with the top piston 16 and the fluid port 23 associated with the bottom piston 18 are vented. Fluid pressure is then applied through the fluid port 24 at the left of the bottom piston 18. As the bottom piston 18 is displaced toward the right, the punch 114, which is attached to the top piston 16, is withdrawn from the workpiece 116.

Figure 8:
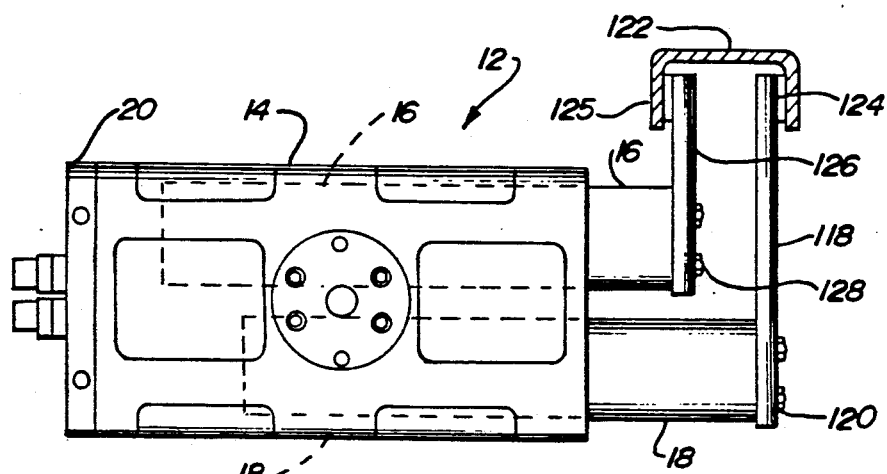
FIG. 8 is a simplified side view of another embodiment of the present invention where a clamping function is performed on a workpiece

FIG. 8 is a side view of another embodiment of the present invention. During the manufacture of articles of commerce, it is desirable in many instances to clamp certain components during assembly. In the previously described embodiment of the present invention shown in FIG. 1, the working fluid pressure is applied to the top piston 16, causing it to extend in a direction toward a workpiece and the bottom piston moves in the opposite direction towards the workpiece under the influence of the double rack and pinion gear coupling. In the embodiment shown in FIG. 8, the fluid pressure is initially applied to the bottom piston 18, causing the tool affixed to its free end to advance toward one side of a workpiece 122. At the same time, the tool attached to the top piston 16 retracts toward the other side of the workpiece 122 because the top piston 16 is driven in the opposite direction by the double rack and pinion gear coupling.

In order to accomplish the above described clamping action of the apparatus 12, a first clamp support bar 118 is secured to the free end of the bottom piston 18 by bolts 120. The end of the first clamp support bar 118 adjacent to the workpiece 122 has a clamp pad 124 attached thereto. The clamp pad 124 can be any material that will not mar the workpiece 122, yet provide a firm seating thereon. A second clamp support bar 126 is attached to the free end of the top piston 16 by bolts 128. The second clamp support bar 126 also has a clamp pad 125 attached to its end which is adjacent to the workpiece 122.

Figure 9:
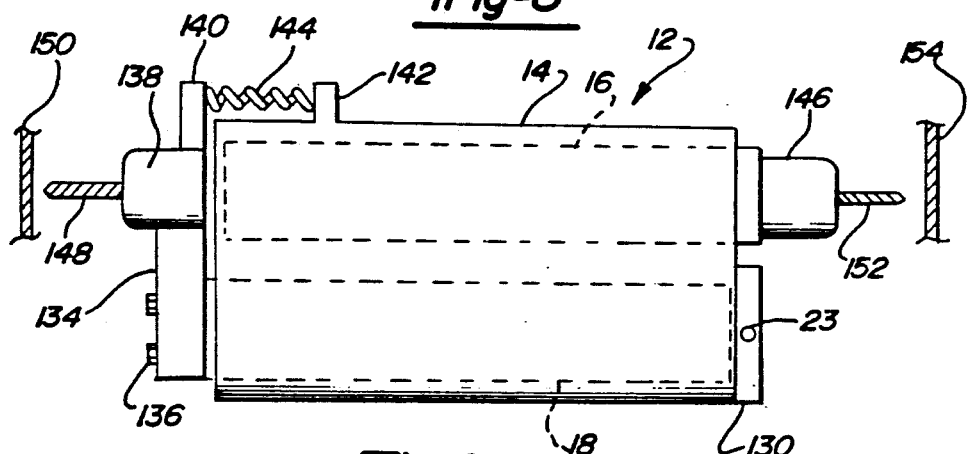
FIG. 9 is a simplified side view of an embodiment of the present invention capable of simultaneous drilling of two spaced apart workpieces.

FIG. 9 is a side view of yet another embodiment of the present invention. In this embodiment, the top piston 16 does not receive a pressurized fluid at either end. An end cap 130 is attached to the right end of the housing block 14 as shown. Fluid pressure is applied to the bottom piston 18 by means of the fluid port 23 provided in the end cap 130. The left end of the bottom piston 18 protrudes from the housing block 14 and has attached thereto a support arm 134. The support arm 134 is held firmly against the end of the bottom piston 18 by bolts 136. A first drill motor 138 is attached to the free end of the support arm 134. The drill motor can be driven by electricity or by air. A spring support bar 140 is attached to the support arm 134 or to the casing of the first drill motor 138. A spring post 142 is formed as an integral part of the housing block 14 or, in the alternative, attached thereto by appropriate fasteners. A tension spring 144 is connected between the spring support bar 140 and the spring post 142. The right end of the top piston 16 protrudes from the housing block 14 and has a second drill motor 146 attached to its protruding end.

When fluid pressure is applied to the right end of the bottom piston 18, it advances a drill 148 held by the first drill motor 138 toward a workpiece 150. The movement of the bottom piston 18 causes the top piston 16 to advance a drill 152 held by the second drill motor 146 in the opposite direction toward a workpiece 154. As the drills 148 and 152 advance toward and through the workpieces 150 and 154, energy is stored in the tension spring 144. Consequently, when the drilling operation is complete, the fluid port 23 is vented permitting the tension spring 144 to return the top and bottom pistons 16 and 18 to their retracted positions.

FIG. 10 is a side view of still another embodiment of the present invention in which the linear movement of one of the pistons is used to impart a rotational motion to the apparatus 12. The apparatus 12 is supported by means of the pivot pins 105 which are received in pivot holes 156 provided in an upstanding support structure 158 having a pair of support brackets 159, one on each side of apparatus 12. Only one of the support brackets 159 is shown in FIG. 10. Each support bracket 159 has a tapered cantilevered arm 160 that extends in the same direction as the free end of the bottom piston 18. Each arm 160 has a non-linear cam slot 162. A horizontally oriented cam follower or pin 164 protrudes from each side of the bottom piston 18 and engages the respective cam slots 162 of the arms 160. The free end of the bottom piston 18 also has attached thereto a tool support bar 166 that has a forming pad 168 at its bottom end. The top piston 16 has a tool support bar 170 attached to its free end. The tool support bar 170 has a forming pad 172 attached to its bottom end.

FIG. 10 shows the apparatus 12 in a position for forming a bend in a workpiece 174. Because of the curvature of the workpiece 174, the apparatus 12 must undergo movement in more than one direction in order to clear the workpiece 174. As the fluid pressure is vented from behind the bottom piston 18 and pressurized fluid is applied to the top piston 16, the forming pads 168 and 172 move horizontally away from each other and from the workpiece 174. During the initial horizontal movement of the bottom piston 18, the pin 164, attached thereto, also moves in a horizontal direction within the right-hand section of the cam slot 162. Since the right-hand section of the cam slot 162 is aligned in a horizontal direction, there is no rotational movement between the apparatus 12 and its support structure 158. As the top and bottom pistons 16 and 18 are further displaced due to the fluid pressure applied to the top piston 16, the pin 164 begins to traverse the inclined portion of the cam slot 162. The change in direction of the motion of the pin 164 in the inclined portion of the cam slot 162 causes the apparatus to rotate about the pivot pins 105 in the pivot holes 156. The combination of the lateral and rotational movement of the forming pads 168 and 172 away from the workpiece 174 permit the workpiece 174 to be moved away from the apparatus 12 without interference therewith.

ASSEMBLY AND OPERATION

The assembly of the dual action apparatus 12 of the present invention is very straightforward. The top and bottom pistons 16 and 18 are inserted into their respective upper and lower piston guides 48 and 50 and the alignment blocks 26 and 28 are then bolted into position locking the pistons in their respective piston guides. The pinion gear 34 and its accompanying pinion shaft 38 is then installed in the housing block 14 with its teeth engaging with the teeth at the right-hand extent of the rack gear 68 on the top piston 16 and at the lefthand extent of the rack gear 68 on the bottom piston 18. The gear plug 32 is then installed to prevent lateral displacement of the pinion gear 34. The cushion probes 72 and proximity sensors 92 are attached to the end cap 20, then the end cap is attached to the end of the housing block 14. Finally, the pivot mounts are attached to the housing block 14.

In the operation of the apparatus 12, the top and bottom pistons 16 and 18 are moved by the application of fluid pressure into one or both of the upper and lower piston guides 48 or 50 which produces a force on the associated top or bottom piston 16 or 18. The fluid pressure can be pneumatic or air pressure which is readily available in most industrial locations. Alternatively, the top and bottom pistons 16 and 18 can be moved by a hydraulic pressure.

While the illustrative embodiments of the invention have been described in considerable detail for the purpose of setting forth practical operative structures whereby the invention may be practiced, it is to be understood that the particular apparatus described is intended to be illustrative only, and that the various novel characteristics of the invention may be incorporated in other structural forms without departing from the spirit and scope of the invention defined in the appended claims.

What is claimed is:

1. An apparatus for moving a tool into and out of engagement with a workpiece comprising:
   a unitary housing block having one end, an opposite end and first and second piston guides, said first and second piston guides being spaced apart and parallel to each other within said unitary housing block, each of said first and second guides further extending throughout the length of said unitary housing block;
   a first piston disposed in said first piston guide of said unitary housing block for linear motion along said first piston guide over a distance less than the length of said first piston guide, said first piston having one end extending out of said one end of said unitary housing block;
   a second piston disposed in said second piston guide of said unitary housing block for complementary linear motion with said first piston along said second piston guide over a distance less than the length of said second piston guide, said first piston and said second piston each having a linear portion which overlap when one of said first piston and said second piston is at the extent of said linear motion;
   a linear gear segment provided on each of said first and second pistons, said linear gear segment being oriented along a portion of the linear extent of said first and second pistons, said linear gear segment being located within said unitary housing block;

a pinion gear disposed within said unitary housing block between said first and second piston guides, said pinion gear having a radial portion extending into each of said first and second piston guides and engaging each said linear gear segments of said first and second pistons for cooperation therewith;

end cap means attached to said unitary housing block enclosing said first and second piston guides within said unitary housing block such that at least one end of each said first and second piston is contained within said unitary housing block to form a first pressure chamber in said first piston guide between said first piston and said end cap means and further to form a second pressure chamber in said second piston guide between said second piston and said end cap means;

first port means connected to said first pressure chamber for permitting a fluid to be delivered to said first pressure chamber to displace said first piston in a first direction and for permitting said fluid to be discharged from said first pressure chamber when said first piston is displaced in a direction opposite said first direction;

second port means connected to said second pressure chamber for permitting a fluid to be delivered to said second pressure chamber to displace said second piston in said first direction and for permitting said fluid to be discharged from said second pressure chamber when said second piston is displaced in said direction opposite said first direction; and means for attaching a tool to at least one of said first and second pistons so that said apparatus can perform useful work on said workpiece.

2. The apparatus of claim 1 wherein said first and second port means are provided through said end cap means.

3. The apparatus of claim 1 further having fluid cushion means positioned within each said first and second pressure chambers for interaction with the fluid being discharged from each said first and second pressure chambers to prevent destructive contact between each said first and second pistons and said end cap means.

4. The apparatus of claim 1 further having fluid metering means for controlling the rate at which said fluid is discharged from each said first and second pressure chamber.

5. The apparatus of claim 1 wherein both said first and second pistons each have means for attaching a tool thereto.

6. The apparatus of claim 5 wherein both said means for attaching tools are disposed on said one end extending out of said unitary housing block.

7. The apparatus of claim 1 wherein said end cap means comprises:

a first end cap attached to said opposite end of said unitary housing block enclosing both said first and second piston guides at said opposite end of said unitary housing block; and a second end cap attached to said one end of said unitary housing block enclosing said second piston guide whereby said second piston is confined within the axial extent of said second piston guide of said unitary housing block.

8. A dual action apparatus comprising:

a unitary housing block of elongate configuration having two spaced apart parallel piston guides provided therein, said two spaced apart parallel piston guides having one end and an opposite end, each of said piston guides further extending throughout the length of said unitary housing block;

a piston disposed in each of said piston guides for complementary motion relative to each other, at least one of said pistons having one end extending out of said unitary housing block and each of said pistons having an opposite end;

means for limiting the linear motion of said pistons over a distance less than the axial extent of said piston guides;

an end cap means attached to said unitary housing block enclosing said piston guides within said unitary housing block such that at least one end of each said piston is contained within said unitary housing block to define a pressure chamber in each of said piston guides between said at least one end of each of said pistons and said end cap means;

fluid port means connected to each of said pressure chambers for permitting a fluid to be delivered to each said pressure chamber to displace each said piston disposed in each said piston guide in a first direction and for permitting said fluid to be discharged from each of said pressure chambers when each said piston is displaced in a direction opposite said first direction;

a gear rack provided on each of said pistons, each of said gear racks being contained within said unitary housing block and having a linear overlapping orientation along a portion of the axial extent of said pistons within said unitary housing block when one of said pistons is at the extent of said complementary motion;

a pinion gear disposed within said unitary housing block between said piston guides and engaging each said rear racks, said pinion gear having a radial portion extending into each said two spaced apart parallel piston guides; and means for attaching a tool to at least one of said pistons so that said apparatus can perform useful work on said workpiece.

9. The apparatus of claim 8 wherein said fluid port means are provided through said end cap means.

10. The apparatus of claim 9 further having fluid cushion means positioned within each of said pressure chambers for interaction with the fluid being discharged from each of said pressure chambers to prevent destructive contact between said pistons and said end cap means.

11. The apparatus of claim 9 having fluid metering means for controlling the rate at which said fluid is discharged from each of said pressure chambers.

12. The apparatus of claim 11 wherein both of said pistons each have means for attaching a tool thereto.

13. The apparatus of claim 12 wherein both of said means for attaching tools are disposed on the ends of a respective one of each of said pistons opposite said end cap means.

14. The apparatus of claim 8 wherein said tool comprises a die block attached to said one end of said at least one of said pistons and a punch holder, including a punch, attached to an end of another of said at least one of said pistons.

15. The apparatus of claim 8 wherein said tool comprises a support bar, including a clamp pad, attached to said one end of each of said pistons.

16. The apparatus of claim 1 further having a support structure pivotably connected to said unitary housing block, said support structure having a cantilevered arm extending in a direction substantially parallel to said one end of said at least one piston extending out of said one end of said unitary housing block;
- a cam slot provided in said cantilevered arm near the end thereof, said cam slot having a non-linear profile; and
- a cam follower attached to one of said pistons, engaging said cam slot.

17. The apparatus of claim 11 further comprising:
- a tension spring attached between said unitary housing block and said protruding end of said at least one piston producing a force to return said at least one piston to its original position when said fluid is exhausted from said pressure chamber.

18. The apparatus of claim 8 wherein said end cap means comprises:
- a first end cap attached to said opposite end of said unitary housing block enclosing both said first and second piston guides at said opposite end of said unitary housing block; and
- a second end cap attached to said one of said unitary housing block enclosing said second piston guide whereby said second piston is confined within the axial extent of said second piston guide of said unitary housing block.

* * * * *

UNITED STATES PATENT AND TRADEMARK OFFICE
CERTIFICATE OF CORRECTION

PATENT NO. : 5,076,090
DATED : December 31, 1991
INVENTOR(S) : Robert W. Cetnarowski It is certified that error appears in the above-identified patent and that said Letters Patent is hereby corrected as shown below:

Column 1, line 49, delete "intermesh" and insert ---- intermeshed ----.

Column 4, line 11, after "workpiece" insert ---- ; ----.

Column 4, line 48, delete "10" and insert ---- 102 ----.

Column 5, line 47, delete "the".

Column 8, line 3, delete "[not" and insert ---- (not ----.

Column 8, line 5, delete ",".

Column 12, line 38, delete "rear" and insert ---- gear ----.

Signed and Sealed this

Twenty-fifth Day of May, 1993

Attest:

MICHAEL K. KIRK

Attesting Officer     Acting Commissioner of Patents and Trademarks